(12) United States Patent
Rivlin et al.

(10) Patent No.: US 8,255,820 B2
(45) Date of Patent: Aug. 28, 2012

(54) ELECTRONIC PAPER DISPLAY DEVICE EVENT TRACKING

(75) Inventors: John Rivlin, Palo Alto, CA (US); Brady Duga, Carlsbad, CA (US); Garth Conboy, La Jolla, CA (US); William Leshner, San Diego, CA (US); Vincent Le Chevalier, San Jose, CA (US); Ruze Richards, Holmdel, NJ (US); Emilio Rojas, Tiburon, CA (US)

(73) Assignee: Skiff, LLC, New York, NY (US)

( * ) Notice: Subject to any disclaimer, the term of this patent is extended or adjusted under 35 U.S.C. 154(b) by 480 days.

(21) Appl. No.: 12/481,306

(22) Filed: Jun. 9, 2009

(65) Prior Publication Data

US 2010/0313161 A1 Dec. 9, 2010

(51) Int. Cl.
*G06F 3/048* (2006.01)

(52) U.S. Cl. .................. 715/771; 715/776

(58) Field of Classification Search .......... 715/776, 715/771
See application file for complete search history.

(56) References Cited

U.S. PATENT DOCUMENTS

| | | | |
|---|---|---|---|
| 4,942,482 A | 7/1990 | Kakinuma et al. |
| 5,239,665 A | 8/1993 | Tsuchiya |
| 5,265,083 A | 11/1993 | Ishii et al. |
| 5,339,091 A | 8/1994 | Yamazaki et al. |
| 5,392,387 A | 2/1995 | Fitzpatrick et al. |
| 5,467,102 A | 11/1995 | Kuno et al. |
| 5,467,538 A | 11/1995 | Chou et al. |
| 5,475,398 A | 12/1995 | Yamazaki et al. |
| 5,475,399 A | 12/1995 | Borsuk |
| 5,477,510 A | 12/1995 | Ukita |
| 5,491,785 A | 2/1996 | Robson et al. |
| 5,524,201 A | 6/1996 | Shwarts et al. |
| 5,587,724 A | 12/1996 | Matsuda |
| 5,624,265 A | 4/1997 | Redford et al. |
| 5,640,552 A | 6/1997 | Yianilos |
| 5,649,186 A | 7/1997 | Ferguson |
| 5,649,538 A | 7/1997 | Langton |
| 5,663,748 A | 9/1997 | Huffman et al. |
| 5,680,557 A | 10/1997 | Karamchetty |
| 5,689,648 A | 11/1997 | Diaz et al. |
| 5,694,546 A | 12/1997 | Reisman |
| 5,696,982 A | 12/1997 | Tanigawa et al. |
| 5,703,624 A | 12/1997 | Van Kruistum |
| 5,708,780 A | 1/1998 | Levergood et al. |
| 5,708,960 A | 1/1998 | Kamisaka et al. |
| 5,717,813 A | 2/1998 | Harman et al. |
| 5,732,260 A | 3/1998 | Nomiyama |

(Continued)

OTHER PUBLICATIONS

International Search Report and Written Opinion for International Application No. PCT/US10/37628, mailed Aug. 6, 2010.

*Primary Examiner* — Tuyetlien Tran

(74) *Attorney, Agent, or Firm* — Hunton & Williams LLP

(57) ABSTRACT

A system for and method for tracking events occurring on an electronic paper display device is presented. The system and method may include detecting an event occurring at the electronic paper display device, identifying the event and a status of the electronic paper display device, wherein the identification of the event comprises using a data structure mapping electronic content structure to one or more identifiers, and transmitting the one or more identifiers associated with the event via a network to a network accessible device.

27 Claims, 5 Drawing Sheets

U.S. PATENT DOCUMENTS

| | | | |
|---|---|---|---|
| 5,734,891 A | 3/1998 | Saigh | |
| 5,739,814 A | 4/1998 | Ohara et al. | |
| 5,761,485 A * | 6/1998 | Munyan | 715/839 |
| 5,761,662 A | 6/1998 | Dasan | |
| 5,761,681 A | 6/1998 | Huffman et al. | |
| 5,761,682 A | 6/1998 | Huffman et al. | |
| 5,768,528 A | 6/1998 | Stumm | |
| 5,774,109 A | 6/1998 | Winksy et al. | |
| 5,774,497 A | 6/1998 | Block et al. | |
| 5,798,785 A | 8/1998 | Hendricks et al. | |
| 5,799,157 A | 8/1998 | Escallon | |
| 5,801,713 A | 9/1998 | Endo et al. | |
| 5,802,516 A | 9/1998 | Shwarts et al. | |
| 5,819,032 A | 10/1998 | De Vries et al. | |
| 5,832,472 A | 11/1998 | Sheppard, II | |
| 5,845,262 A | 12/1998 | Nozue et al. | |
| 5,847,698 A | 12/1998 | Reavey et al. | |
| 5,864,823 A | 1/1999 | Levitan | |
| 5,907,845 A | 5/1999 | Cox et al. | |
| 5,909,207 A | 6/1999 | Ho | |
| 5,909,690 A | 6/1999 | Tanigawa et al. | |
| 5,914,706 A | 6/1999 | Kono | |
| 5,914,707 A | 6/1999 | Kono | |
| 5,924,068 A | 7/1999 | Richard et al. | |
| 5,937,162 A | 8/1999 | Funk et al. | |
| 5,956,034 A | 9/1999 | Sachs et al. | |
| 5,956,225 A | 9/1999 | Okuyama et al. | |
| 5,957,695 A | 9/1999 | Redford et al. | |
| 5,970,231 A | 10/1999 | Crandall | |
| 5,974,396 A | 10/1999 | Anderson et al. | |
| 5,986,690 A | 11/1999 | Hendricks | |
| 5,990,927 A | 11/1999 | Hendricks et al. | |
| 5,991,594 A | 11/1999 | Froeber et al. | |
| 5,995,976 A | 11/1999 | Walker et al. | |
| 6,029,182 A | 2/2000 | Nehab et al. | |
| 6,064,384 A | 5/2000 | Ho | |
| 6,072,476 A | 6/2000 | Harada et al. | |
| 6,078,651 A | 6/2000 | Den Hartog | |
| 6,102,802 A | 8/2000 | Armstrong | |
| 6,125,388 A | 9/2000 | Reisman | |
| 6,144,380 A | 11/2000 | Shwarts et al. | |
| 6,154,214 A | 11/2000 | Uyehara et al. | |
| 6,172,664 B1 | 1/2001 | Nakasuji et al. | |
| 6,181,344 B1 | 1/2001 | Tarpenning et al. | |
| 6,195,667 B1 | 2/2001 | Duga et al. | |
| 6,201,947 B1 | 3/2001 | Hur et al. | |
| 6,209,787 B1 | 4/2001 | Iida | |
| 6,229,502 B1 | 5/2001 | Schwab | |
| 6,243,071 B1 | 6/2001 | Shwarts et al. | |
| 6,249,863 B1 | 6/2001 | Redford et al. | |
| 6,252,476 B1 | 6/2001 | Maloratsky | |
| 6,252,602 B1 | 6/2001 | Matsuda et al. | |
| 6,275,934 B1 | 8/2001 | Novicov et al. | |
| 6,279,013 B1 | 8/2001 | LaMarca et al. | |
| 6,297,812 B1 | 10/2001 | Ohara et al. | |
| 6,297,824 B1 | 10/2001 | Hearst et al. | |
| 6,313,828 B1 | 11/2001 | Chombo | |
| 6,314,474 B1 | 11/2001 | Walter et al. | |
| 6,320,591 B1 | 11/2001 | Griencewic | |
| 6,330,563 B1 | 12/2001 | Heckerman et al. | |
| 6,330,591 B1 | 12/2001 | Ducaroir et al. | |
| 6,331,865 B1 | 12/2001 | Sachs et al. | |
| 6,331,867 B1 | 12/2001 | Eberhard et al. | |
| 6,335,678 B1 | 1/2002 | Heutschi | |
| 6,337,254 B1 | 1/2002 | Ahn | |
| 6,344,863 B1 | 2/2002 | Capelli et al. | |
| 6,347,997 B1 | 2/2002 | Armstrong | |
| 6,351,750 B1 | 2/2002 | Duga et al. | |
| 6,356,287 B1 | 3/2002 | Ruberry et al. | |
| 6,363,418 B1 | 3/2002 | Conboy et al. | |
| 6,374,273 B1 | 4/2002 | Webster | |
| 6,377,963 B1 | 4/2002 | Walker et al. | |
| 6,385,614 B1 | 5/2002 | Vellandi | |
| 6,389,615 B2 | 5/2002 | Perrier | |
| 6,401,075 B1 | 6/2002 | Mason et al. | |
| 6,408,437 B1 | 6/2002 | Hendricks et al. | |
| 6,411,973 B1 | 6/2002 | Yianilos | |
| 6,430,549 B1 | 8/2002 | Gershfield et al. | |
| 6,438,588 B1 | 8/2002 | Crandall | |
| 6,441,811 B1 | 8/2002 | Sawada et al. | |
| 6,446,045 B1 | 9/2002 | Stone et al. | |
| 6,452,615 B1 | 9/2002 | Chiu et al. | |
| 6,460,036 B1 | 10/2002 | Herz | |
| 6,462,729 B2 | 10/2002 | Morita | |
| 6,466,918 B1 | 10/2002 | Spiegel et al. | |
| 6,486,866 B1 | 11/2002 | Kuwahara et al. | |
| RE37,929 E | 12/2002 | Fernandez | |
| 6,491,227 B2 | 12/2002 | Izumi et al. | |
| 6,493,734 B1 | 12/2002 | Sachs et al. | |
| 6,496,803 B1 | 12/2002 | Seet et al. | |
| 6,507,342 B1 | 1/2003 | Hirayama | |
| 6,512,497 B1 | 1/2003 | Kondo et al. | |
| 6,513,117 B2 | 1/2003 | Tarpenning et al. | |
| 6,519,584 B1 | 2/2003 | Tognazzini et al. | |
| 6,525,706 B1 | 2/2003 | Rehkemper et al. | |
| 6,529,185 B1 | 3/2003 | Armstrong | |
| 6,529,946 B2 | 3/2003 | Yokono et al. | |
| 6,549,935 B1 | 4/2003 | Lapstun et al. | |
| 6,594,548 B2 | 7/2003 | Bagnordi | |
| 6,594,692 B1 | 7/2003 | Reisman | |
| 6,597,314 B1 | 7/2003 | Beezer et al. | |
| 6,639,577 B2 | 10/2003 | Eberhard | |
| 6,642,502 B2 | 11/2003 | Iwaki | |
| 6,687,876 B1 | 2/2004 | Schilit et al. | |
| 6,701,301 B2 | 3/2004 | Seet et al. | |
| 6,704,733 B2 | 3/2004 | Clark et al. | |
| 6,708,189 B1 | 3/2004 | Fitzsimmons et al. | |
| 6,712,701 B1 | 3/2004 | Boylan, III et al. | |
| 6,714,797 B1 | 3/2004 | Rautila | |
| 6,725,203 B1 | 4/2004 | Seet et al. | |
| 6,726,487 B1 | 4/2004 | Dalstrom | |
| 6,750,978 B1 | 6/2004 | Marggraff et al. | |
| 6,763,995 B1 | 7/2004 | Song | |
| 6,766,362 B1 | 7/2004 | Miyasaka et al. | |
| 6,788,292 B1 | 9/2004 | Nako et al. | |
| 6,804,659 B1 * | 10/2004 | Graham et al. | 705/14.49 |
| 6,826,534 B1 | 11/2004 | Gupta et al. | |
| 6,826,725 B1 | 11/2004 | Beezer et al. | |
| 6,829,587 B2 | 12/2004 | Stone et al. | |
| 6,845,485 B1 | 1/2005 | Shastri et al. | |
| 6,859,206 B2 | 2/2005 | Cleveland | |
| 6,859,218 B1 | 2/2005 | Luman et al. | |
| 6,868,405 B1 | 3/2005 | DeTreville | |
| 6,886,036 B1 | 4/2005 | Santamaki et al. | |
| 6,891,551 B2 | 5/2005 | Keely et al. | |
| 6,895,393 B1 | 5/2005 | Numata et al. | |
| 6,897,850 B2 | 5/2005 | Sugimoto | |
| 6,904,567 B1 | 6/2005 | Hermann et al. | |
| 6,907,407 B1 | 6/2005 | Yamanoue et al. | |
| 6,933,928 B1 | 8/2005 | Lilienthal | |
| 6,940,497 B2 | 9/2005 | Vincent et al. | |
| 6,943,773 B2 | 9/2005 | Wong et al. | |
| 6,954,735 B1 | 10/2005 | Djupsjobacka et al. | |
| 6,954,738 B2 | 10/2005 | Wang et al. | |
| 6,972,752 B2 | 12/2005 | Nako et al. | |
| 6,975,333 B2 | 12/2005 | Kanai et al. | |
| 6,976,010 B2 | 12/2005 | Banerjee et al. | |
| 6,976,225 B2 | 12/2005 | Ho | |
| 6,981,214 B1 | 12/2005 | Miller et al. | |
| 6,985,913 B2 | 1/2006 | Murata | |
| 6,987,221 B2 | 1/2006 | Platt | |
| 6,989,815 B2 | 1/2006 | Liang et al. | |
| 6,990,464 B1 | 1/2006 | Pirillo | |
| 6,990,489 B2 | 1/2006 | Kondo et al. | |
| 6,990,633 B1 | 1/2006 | Miyasaka et al. | |
| 6,995,745 B2 | 2/2006 | Boon et al. | |
| 7,009,596 B2 | 3/2006 | Seet et al. | |
| 7,010,500 B2 | 3/2006 | Aarino | |
| 7,013,478 B1 | 3/2006 | Hendricks et al. | |
| 7,020,663 B2 | 3/2006 | Hay et al. | |
| 7,028,258 B1 | 4/2006 | Thacker et al. | |
| 7,031,651 B2 | 4/2006 | McCormick et al. | |
| 7,031,657 B2 | 4/2006 | Tehrani | |
| 7,039,868 B2 | 5/2006 | Yanatsubo | |
| 7,047,276 B2 | 5/2006 | Liu et al. | |
| 7,054,660 B2 | 5/2006 | Lord | |
| 7,055,737 B1 | 6/2006 | Tobin et al. | |

| | | |
|---|---|---|
| 7,057,591 B1 * | 6/2006 | Hautanen et al. ............... 345/87 |
| 7,065,497 B1 | 6/2006 | Brewster et al. |
| 7,071,915 B2 | 7/2006 | Liang et al. |
| 7,071,930 B2 | 7/2006 | Kondo et al. |
| 7,083,095 B2 | 8/2006 | Hendrick |
| 7,090,128 B2 | 8/2006 | Farley et al. |
| 7,103,848 B2 | 9/2006 | Barsness et al. |
| 7,107,533 B2 | 9/2006 | Duncan et al. |
| 7,117,167 B2 | 10/2006 | Seal et al. |
| 7,117,843 B2 | 10/2006 | Liu et al. |
| 7,124,100 B2 | 10/2006 | Pirillo |
| 7,136,177 B1 | 11/2006 | Bryan et al. |
| 7,136,178 B1 | 11/2006 | Gupta et al. |
| 7,136,880 B2 | 11/2006 | Wilkins et al. |
| 7,138,982 B2 | 11/2006 | Sugimoto |
| 7,139,977 B1 | 11/2006 | Russell |
| 7,149,353 B2 | 12/2006 | Siegel et al. |
| 7,149,541 B2 | 12/2006 | Rautila |
| 7,165,039 B2 | 1/2007 | Seet et al. |
| 7,165,217 B1 | 1/2007 | Kondo |
| 7,167,165 B2 | 1/2007 | Keely et al. |
| 7,174,054 B2 | 2/2007 | Manber et al. |
| 7,174,567 B2 | 2/2007 | Keramane |
| 7,177,845 B2 | 2/2007 | DeTreville |
| 7,185,811 B2 | 3/2007 | Tomita |
| 7,191,399 B2 | 3/2007 | Ohtani et al. |
| 7,193,605 B2 | 3/2007 | Vincent et al. |
| 7,193,609 B2 | 3/2007 | Lira |
| 7,201,317 B2 | 4/2007 | Song |
| 7,205,959 B2 | 4/2007 | Henriksson |
| 7,209,893 B2 | 4/2007 | Nii |
| 7,219,064 B2 | 5/2007 | Nakakita et al. |
| 7,225,400 B2 | 5/2007 | Beezer et al. |
| 7,228,293 B2 | 6/2007 | DeTreville |
| 7,236,966 B1 | 6/2007 | Jackson et al. |
| 7,239,842 B2 | 7/2007 | Nijim |
| 7,246,118 B2 | 7/2007 | Chastain et al. |
| 7,246,164 B2 | 7/2007 | Lehmann et al. |
| 7,251,647 B2 | 7/2007 | Hoblit |
| 7,256,801 B2 | 8/2007 | Baar et al. |
| 7,259,753 B2 | 8/2007 | Keely et al. |
| 7,260,780 B2 | 8/2007 | Ma |
| 7,272,639 B1 | 9/2007 | Levergood et al. |
| 7,289,083 B1 | 10/2007 | Canova, Jr. |
| 7,290,285 B2 | 10/2007 | McCurdy et al. |
| 7,296,225 B2 | 11/2007 | Hayashi |
| 7,298,851 B1 | 11/2007 | Hendricks et al. |
| 7,299,414 B2 | 11/2007 | Maeno et al. |
| 7,299,501 B2 | 11/2007 | Hendricks |
| 7,304,635 B2 | 12/2007 | Seet et al. |
| 7,311,246 B2 | 12/2007 | Arisawa |
| 7,321,868 B2 | 1/2008 | Ukita et al. |
| 7,326,788 B2 | 2/2008 | Wall et al. |
| 7,330,176 B2 | 2/2008 | Liang et al. |
| 7,342,569 B2 | 3/2008 | Liang et al. |
| 7,350,704 B2 | 4/2008 | Barsness et al. |
| 7,355,591 B2 | 4/2008 | Sugimoto |
| 7,359,944 B2 | 4/2008 | An |
| 7,372,915 B1 | 5/2008 | Sako et al. |
| 7,373,594 B1 | 5/2008 | Lopez et al. |
| 7,376,582 B2 | 5/2008 | Seet et al. |
| 7,386,804 B2 | 6/2008 | Ho et al. |
| 7,394,452 B2 | 7/2008 | Wong et al. |
| 7,395,051 B2 | 7/2008 | Griffin |
| 7,401,286 B1 | 7/2008 | Hendricks et al. |
| 7,403,924 B2 | 7/2008 | Sakamura et al. |
| 7,415,191 B2 | 8/2008 | Sako et al. |
| 7,429,965 B2 | 9/2008 | Weiner |
| 7,433,893 B2 | 10/2008 | Lowry |
| 7,436,318 B2 * | 10/2008 | Affolter et al. ......... 340/815.83 |
| 7,437,318 B2 | 10/2008 | Yuen et al. |
| 7,444,513 B2 | 10/2008 | Nyman et al. |
| 7,447,771 B1 | 11/2008 | Taylor |
| 7,453,445 B2 | 11/2008 | Amundson |
| 7,454,713 B2 | 11/2008 | Spalink et al. |
| 7,454,763 B2 | 11/2008 | Veselova et al. |
| 7,456,834 B2 | 11/2008 | Cleveland |
| 7,467,349 B1 | 12/2008 | Bryar et al. |
| 7,471,284 B2 | 12/2008 | Bathiche et al. |
| D584,302 S | 1/2009 | Sogabe |
| 7,483,871 B2 | 1/2009 | Herz |
| 7,594,187 B2 * | 9/2009 | Baird et al. ................ 715/805 |
| 7,783,986 B2 * | 8/2010 | Barsness et al. ............ 715/776 |
| 2001/0007980 A1 * | 7/2001 | Ishibashi et al. ............ 705/26 |
| 2002/0000984 A1 * | 1/2002 | Asai et al. ..................... 345/211 |
| 2002/0035697 A1 * | 3/2002 | McCurdy et al. ........... 713/200 |
| 2002/0083435 A1 * | 6/2002 | Blasko et al. ................. 725/14 |
| 2002/0107759 A1 | 8/2002 | An ................................. 705/26 |
| 2002/0120564 A1 * | 8/2002 | Strietzel ........................ 705/40 |
| 2002/0124182 A1 * | 9/2002 | Bacso et al. ................. 713/200 |
| 2002/0151992 A1 * | 10/2002 | Hoffberg et al. ............. 700/83 |
| 2002/0184370 A1 | 12/2002 | Simpson et al. |
| 2003/0069812 A1 | 4/2003 | Yuen et al. |
| 2003/0093312 A1 | 5/2003 | Ukita et al. |
| 2003/0210226 A1 * | 11/2003 | Ho et al. ....................... 345/156 |
| 2003/0218604 A1 | 11/2003 | Wood et al. |
| 2004/0019683 A1 | 1/2004 | Lee et al. |
| 2004/0049571 A1 * | 3/2004 | Johnson et al. ............... 709/224 |
| 2004/0064369 A1 | 4/2004 | Kato |
| 2004/0103426 A1 * | 5/2004 | Ludvig et al. ................. 725/9 |
| 2004/0162760 A1 * | 8/2004 | Seet et al. ...................... 705/14 |
| 2004/0225716 A1 | 11/2004 | Shamir et al. |
| 2005/0076012 A1 | 4/2005 | Manber et al. |
| 2005/0114333 A1 | 5/2005 | Nagano et al. |
| 2005/0240588 A1 | 10/2005 | Siegel et al. |
| 2006/0078047 A1 * | 4/2006 | Shu et al. ................. 375/240.01 |
| 2006/0136295 A1 * | 6/2006 | Bobick et al. .................. 705/14 |
| 2006/0161578 A1 | 7/2006 | Siegel et al. |
| 2006/0195866 A1 * | 8/2006 | Thukral ........................ 725/34 |
| 2006/0212435 A1 | 9/2006 | Williams et al. |
| 2006/0248057 A1 * | 11/2006 | Jacobs et al. ..................... 707/3 |
| 2006/0294071 A1 | 12/2006 | Kim et al. |
| 2007/0027781 A1 | 2/2007 | Seal et al. |
| 2007/0036514 A1 | 2/2007 | Takai et al. |
| 2007/0053513 A1 * | 3/2007 | Hoffberg ..................... 380/201 |
| 2007/0106794 A1 | 5/2007 | Manber et al. |
| 2007/0134645 A1 | 6/2007 | Henriksson |
| 2007/0165996 A1 | 7/2007 | Inaba et al. |
| 2007/0168413 A1 | 7/2007 | Barletta et al. |
| 2007/0168506 A1 * | 7/2007 | Douglas et al. ............... 709/224 |
| 2007/0204097 A1 | 8/2007 | Yokono et al. |
| 2007/0233714 A1 | 10/2007 | Tsuchiya |
| 2007/0234203 A1 | 10/2007 | Shagam et al. |
| 2007/0237401 A1 | 10/2007 | Coath et al. |
| 2007/0237428 A1 | 10/2007 | Goodwin et al. |
| 2008/0010112 A1 * | 1/2008 | Kniaz et al. ..................... 705/14 |
| 2008/0030847 A1 | 2/2008 | Murison et al. |
| 2008/0040403 A1 | 2/2008 | Hayashi |
| 2008/0051986 A1 | 2/2008 | Amano et al. |
| 2008/0077492 A1 * | 3/2008 | Ho et al. ........................ 705/14 |
| 2008/0079972 A1 | 4/2008 | Goodwin et al. |
| 2008/0082497 A1 | 4/2008 | Leblang et al. |
| 2008/0162356 A1 * | 7/2008 | Parket et al. .................. 705/53 |
| 2008/0163039 A1 | 7/2008 | Ryan et al. |
| 2008/0168073 A1 | 7/2008 | Siegel et al. |
| 2008/0195546 A1 | 8/2008 | Lilley |
| 2008/0222156 A1 | 9/2008 | Ryan et al. |
| 2008/0243788 A1 | 10/2008 | Reztlaff et al. |
| 2008/0243991 A1 | 10/2008 | Ryan et al. |
| 2008/0294674 A1 | 11/2008 | Reztlaff, II et al. |
| 2008/0295018 A1 * | 11/2008 | Nurmi et al. ................ 715/780 |
| 2008/0306907 A1 | 12/2008 | Biswal et al. |
| 2009/0003592 A1 | 1/2009 | Hanai |
| 2009/0013027 A1 | 1/2009 | Tanaka |

* cited by examiner

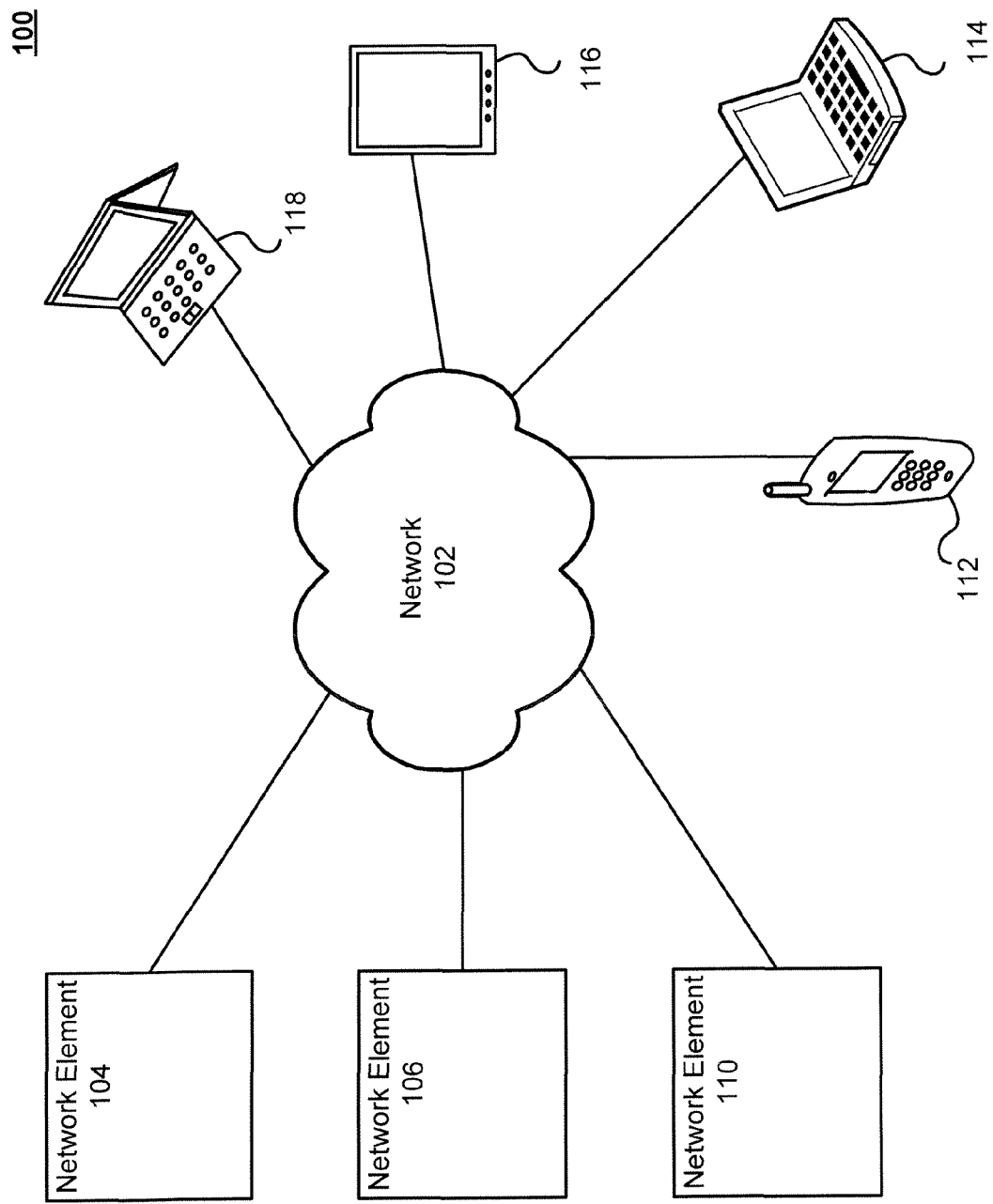

```xml
<?xml version="1.0" encoding="UTF-8"?>
<idmap xmlns="idmap-dd462920-0833-11dd-bd0b-0800200c9a66"
contentid="NYT_20080312_1315">
  <zoom state="0">

<id>P011_00001</id>
       <id>P01C_00002</id>
       <id>P123_0000F</id>
       <id>P078_00011</id>
       <id>P36D_00777</id>
       <id>N011_00345</id>
       <id>N011_00346</id>
       <id>N107_00123</id>
       <id>N107_00124</id>
       <id>N031_01234</id>

</zoom>
  <zoom state="1">

<id>P011_00001</id>
       <id>P01C_00002</id>
       <id>P123_0000F</id>
       <id>P078_00011</id>
       <id>P36D_00777</id>

<id>P36D_00777</id>
       <id>N011_00345</id>
       <id>N011_00346</id>
       <id>N107_00123</id>
       <id>N107_00124</id>
       <id>N031_01234</id>

</zoom>

<link linkid="L011_00001"
        attributes="id="L011_00001"
                    href="#picture1"" />

<link linkid="L023_00021"
        attributes="id="L023_00021"
                    href="#picture4"" />

<link linkid="L022_00121"
        attributes="id="L022_00121"
                    href="#picture5"" />

</idmap>
```

Fig. 2

ELECTRONIC PAPER DISPLAY DEVICE EVENT TRACKING

BACKGROUND INFORMATION

Tracking events occurring at a user device, such as the viewing of pages of electronic content, can provide valuable information for marketing, diagnostic, planning, or other purposes. However, current systems and methods require a significant amount of data to be sent to a device or system for tracking purposes to provide such information in a meaningful way. The data is accrued at frequent intervals (e.g., whenever a user changes pages, changes a display state, etc.). The communication and processing of these tracking events uses valuable bandwidth and processing time.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 1 is a schematic diagram of a system for tracking electronic paper display device events according to an embodiment of the present invention;

FIG. 2 shows a sample of XML ID mapping format in accordance with an embodiment of the present disclosure;

DETAILED DESCRIPTION OF PREFERRED EMBODIMENTS

Figure 3:
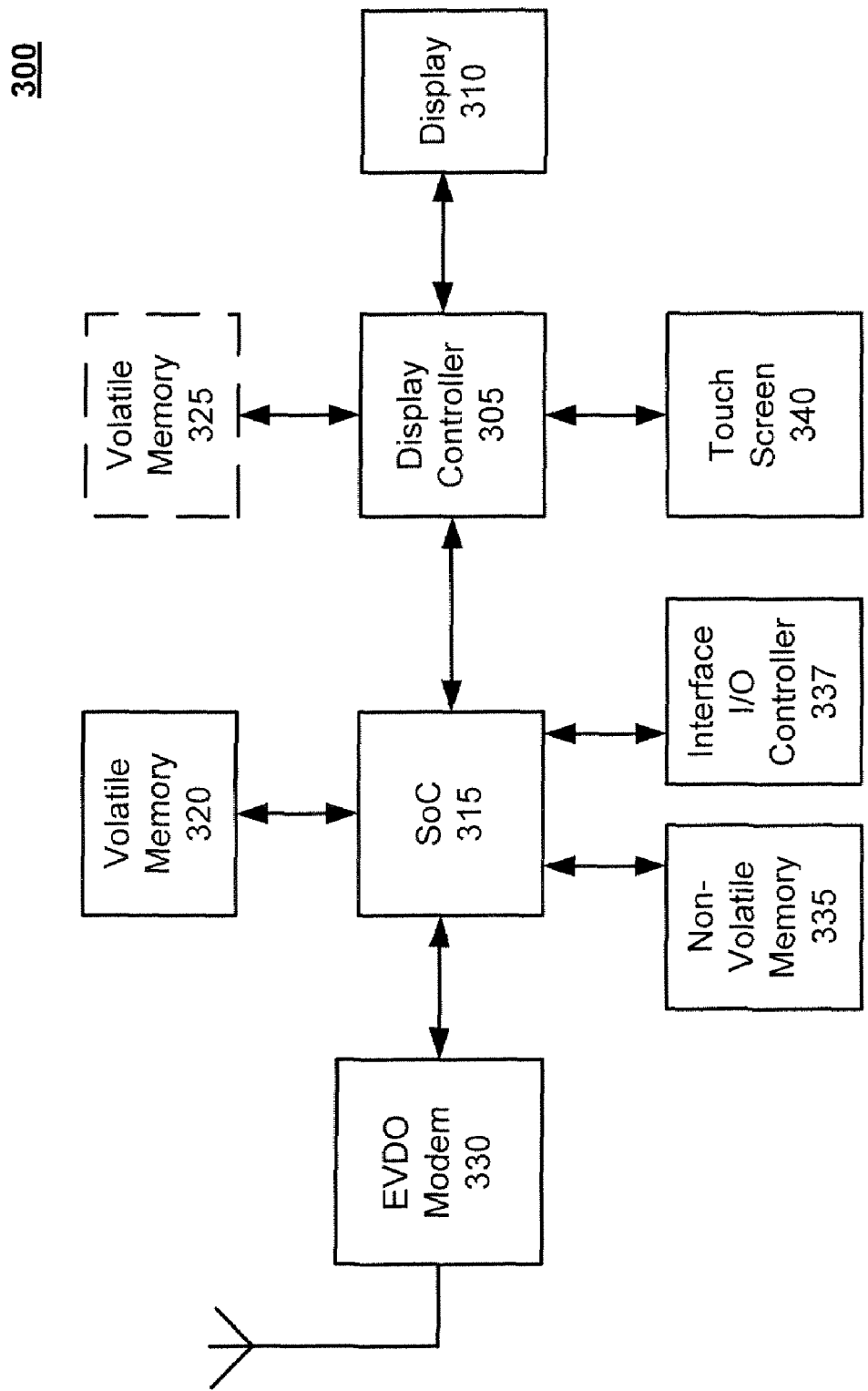
FIG. 3 is a schematic diagram of an electronic paper display device according to an embodiment of the present invention.

Certain embodiments of the present invention provide tracking electronic paper display device events. More particularly, certain embodiments of the present invention provide a system for and method of tracking electronic paper display device events and a log of such events. Electronic paper display devices may track events, such as page views, device power statuses, resource requests, resource responses and other events. For example, an electronic paper display device may track a resource request such as a click on a URL ("Uniform Resource Locator"). To track one or more events, an electronic paper display device may use a data structure mapping electronic content structure to one or more identifiers. One or more portions of data associated with an event may be compared against the data structure to identify a corresponding identifier. A corresponding identifier may be transmitted to a network accessible element such as, for example, a server. The network accessible element may record the electronic paper display device event.

Electronic paper display devices may be, by way of non-limiting example, a device utilizing an electronic paper display (referred to herein as "EPD"), such as electrophoretic displays or electro-wetting displays. Examples of such displays include those disclosed in, by way of example rather than limitation, U.S. Pat. Nos. 6,577,433, 6,529,313, 6,525,866, 6,574,034, 6,017,584, 6,067,185, 6,118,426, 6,120,839, 6,124,851, 6,130,774, 6,172,798, 6,177,921, 6,232,950 and 6,249,271.

FIG. 1 is a schematic diagram of a system for tracking electronic paper display device events according to an embodiment. Network elements 104, 106, and 110 may be communicatively coupled to network 102. One or more of electronic paper display devices 112, 114, 116, and 118 may be communicatively coupled to network 102. In one or more embodiments, an electronic paper display device, such as electronic paper display device 116, may at times not be connected to a network.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n, and 802.11g or any other wired or wireless network that permits communication between network elements 104, 106, and 110, electronic paper display devices 112, 114, 116, and 118, and other devices communicatively coupled to network 102. In addition, network 102 may include, without limitation, telephone line, fiber optics, IEEE Ethernet 802.3, a Wide Area Network ("WAN"), a Local Area Network ("LAN"), or a global network such as the Internet. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a publisher's network, an electronic content provider network, corporate networks, and home networks.

In one or more embodiments, network 102 may be used to distribute electronic content. Exemplary content distribution networks are disclosed in U.S. application Ser. No. 12/248,482, titled "Systems, Methods and Apparatus for Content Distribution," filed on Oct. 9, 2008 and U.S. provisional application No. 60/978,748, titled "Content Distribution and Preloading," filed on Oct. 9, 2007; the contents of both applications are hereby incorporated by reference in their entireties.

Network elements 104, 106, and 110 may be servers, network storage devices or other devices communicatively coupled to network 102. In one or more embodiments, network elements 104, 106, and 110 may perform any, or a combination, of receiving electronic paper display device event identifiers, storing electronic paper display device event data, analyzing electronic paper display device event data, providing electronic paper display device event data analysis to other components or devices, responding to electronic paper display device events, generating data structures mapping electronic content to identifiers, and distributing data structures mapping electronic content. Network elements 104, 106, and 110 may also perform any, or a combination, of storing, receiving, transmitting, producing, aggregating, and uploading electronic content. Network elements 104, 106, and 110 may also perform other electronic content management functionality including, but not limited to any, or a combination, of account management, target marketing of electronic content to electronic paper display device users, user electronic content tracking, and content distribution. According to one or more embodiments, one or more portions of the above functionality may be performed by electronic paper display devices 112, 114, 116, and 118.

Network elements 104, 106, and 110 may contain or be communicatively coupled to storage, such as a Redundant Array of Inexpensive Disks ("RAID"), a Storage Area Network ("SAN"), an internet Small Computer Systems Interface ("iSCSI") SAN, a Fibre Channel SAN, a Common Internet File System ("CIFS"), Network Attached Storage ("NAS"), a Network File System ("NFS"), tape drive based storage, or other computer accessible storage.

Network elements 104, 106, and 110 communicate with any, or a combination, of other systems, applications, and storage locations directly via one or more of an Application Programming Interface ("API"), a Remote Procedure Call ("RPC"), an interface table, a web service, an Extensible Markup Language ("XML") based interface, a Simple Object Access Protocol ("SOAP") based interface, a Common Object Request Broker Architecture ("CORBA") based interface, and other interfaces for sending or receiving information. For example, network elements 104, 106, and 110 may communicate with accounting systems, marketing systems, Interactive Voice Response ("IVR") systems, systems of content providers, or other systems, servers, or components to facilitate electronic content caching and transactions.

According to some embodiments, network elements 104, 106, and 110 may each be responsible for different functionality in an electronic content distribution and management network. By way of non-limiting example, network element 104 may produce, receive, organize and aggregate electronic content, such as periodicals, books, newsletters, or other electronic content. Such electronic content may be aggregated from one or more feeds, such as publishers, resellers, newspapers, journalists, news services, broadcasts, or other sources. Processing of electronic content may include any, or a combination, of indexing, categorizing, storing, formatting, translating, filtering, spell checking, compressing, encrypting, securing, replicating, and further processing. Electronic content may be produced by user or third-party input (e.g., blogs, newsletters, etc.). Such content may be input via, by way of non-limiting example, typed input or dictations processed by speech to text input (e.g., text of speeches, conferences, proceedings, hearings, etc.). Electronic content may be produced by scanning existing text, such as by way of non-limiting example, by Optical Character Recognition ("OCR") processes. Other scanning processes may produce electronic content without performing OCR processes. Network element 104 may translate content from one format to another. For example, network element 104 may receive content from a subscriber and may translate the content into one or more electronic formats including, but not limited to, proprietary formats utilized by one or more e-book readers. Network element 104 may receive subscriber or user content via emails, FTP ("File Transfer Protocol"), HTTP ("Hyper Text Transfer Protocol"), text message (e.g., via Short Message Service ("SMS")), Multi-Media Messaging Service ("MMS"), Wireless Access Protocol ("WAP"), or via other electronic communication protocols. Categorization of content by network element 104 may include any, or a combination, of organizing content, storing content, and indexing content by one or more of a subject, subscription, and access. By way of non-limiting example, content may be grouped or stored in databases or other storage which may be separated according to subscription.

According to one or more embodiments, network element 104 may perform one or more additional functionalities. For example, network element 104 may contain or access one or more of user subscription information, accounting information, payment information, account identification, and statistics associated with user access to one or more portions of electronic content. Network element 104 may interface to other systems or components, either local or remote, such as accounting systems, Customer Relationship Management ("CRM") systems, marketing systems, payment systems, authentication systems, network access servers, or other network systems or components. Network element 104 may monitor one or more accounts and may monitor access to electronic content stored on, distributed by or accessible from network 102 or one or more devices communicatively coupled to network 102. Account information may be provided to network element 104 or other network accessible components to generate usage information, verify transactions, or for other functionality. Subscription information, usage agreement information, and registration information obtained from a user of an electronic content network may contain demographic information, preference information, or other information which may be utilized for marketing purposes.

According to one or more embodiments, network element 106 may generate mapping data structures which may correlate or map portions of electronic content with one or more identifiers. For example, a data structure may comprise a mapping of XML elements associated with electronic content to one or more identifiers. The mapping may provide other information such as a zoom state. A plurality of versions of mapping may be available for each portion of electronic content. The versions may correspond to different zoom states or other viewing criteria. Data structures for mapping electronic content to identifiers are discussed in further detail in reference to FIG. 2 below.

Network element 106 may generate mapping data structures during publication of electronic content or subsequent to publication of electronic content. Network element 106 may perform one or more of distribution, synchronization, updating and management of mapping data structures. For example, network element 106 may provide mapping data structures to electronic paper display devices 112, 114, 116, and 118 together with corresponding electronic content or separate from electronic content corresponding to the mapping data structures. Network element 106 may generate additional mapping data structures to reflect updated or edited content.

Electronic paper display devices 112, 114, 116, and 118 may be electronic book ("e-book") readers, E-Ink® devices, desktop computers, laptop computers, wireline phones, mobile phones, Personal Digital Assistants ("PDA"), personal media players, gaming devices, or other devices capable of displaying electronic content and tracking events such as user activity and device events. In one or more embodiments, electronic paper display devices 112, 114, 116, and 118 may access electronic content locally via one or more device interfaces.

Electronic paper display devices 112, 114, 116, and 118 may detect events via a user interface, such as a touch screen control, a key or button press, or other user interface controls. Electronic paper display devices 112, 114, 116, and 118 may detect other events such as an error condition detected by a processor of the device, another condition detected by one or more components of the device, or an event received as input from a network interface. The detection of events is discussed in further detail in reference to FIG. 3 below.

According to some embodiments, electronic paper display devices 112, 114, 116, and 118 may access electronic content and provide user activity and device event information via one or more network interfaces. Electronic paper display devices 112, 114, 116, and 118 may transmit and receive data to and from network 102 utilizing a standard telecommunications protocol or a standard networking protocol. By way of non-limiting example, one embodiment may utilize FTP ("File Transfer Protocol"), HTTP ("Hyper Text Transfer Protocol"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Transmission Control Protocol/Internet ("TCP/IP") Protocols, or other protocols or systems suitable for transmitting and receiving electronic content data. Electronic content may be transmitted and received wirelessly or may utilize cabled network or telecom connections such as an Ethernet RJ45/Category 5 connection, a fiber connection, a traditional phone wireline connection, a cable connection or other wired network connection. Electronic paper display devices 112, 114, 116, and 118 may use standard wireless protocols including IEEE 802.11 and 802.16. Electronic paper display devices 112, 114, 116, and 118 may also be connected to network 102 via protocols for a wired connection, such as an IEEE Ethernet 802.3.

By way of non-limiting example, electronic paper display devices 112, 114, 116, and 118 may contain one or more interfaces including, a USB ("Universal Serial Bus") connection, an RS-232 or serial connection, a Bluetooth connection, an RFID ("Radio Frequency IDentification") reader or interrogator, an RFID tag (active or passive), a firewire connection, or interfaces supporting storage media (e.g., flash memory cards, CDs, DVDs). As described in more detail with reference to FIG. 3 below, an electronic paper display device may contain non-volatile memory for storing event logging data and cached electronic content.

According to one or more embodiments, electronic paper display devices 112, 114, 116, and 118 may contain a Global Positioning System ("GPS") receiver or other components capable of approximating the location of an electronic paper display device. Other methods of approximating location may be used including, but not limited to, cellular telecommunications handoff algorithms, network triangulation, trilateration, multilateration, measurements of signal strength, measurements of signal attenuation, measurements of noise, and dynamically associated network address information (e.g., detecting that a user device is associated with a network address of a service provider in a particular region). In one or more embodiments, electronic paper display devices 112, 114, 116, and 118 may contain mapping software enabling a user to specify a current location and obtain directions and other information. Location information obtained from these techniques and others may be tracked and movement of an electronic paper display device may be logged as an event. For example, movement of an electronic paper display device out of a service area may be logged.

According to one or more embodiments, one or more portions of an electronic paper display device containing unauthorized electronic content (e.g., copied or stolen) may be disabled. Exemplary systems and methods for disabling electronic paper display devices are disclosed in U.S. patent application Ser. No. 12/578,972 entitled "Disabling Electronic paper display devices" filed Oct. 14, 2009, which is hereby incorporated by reference in its entirety. Detection of an event associated with unauthorized electronic content or actions may be logged.

According to one or more embodiments, electronic paper display devices 112, 114, 116, and 118 may track user activity such as, for example, viewing a page of electronic content on the electronic paper display device. Electronic paper display devices 112, 114, 116, and 118 may track a page view event by identifying the portion of electronic content viewed using a data structure mapping portions of electronic content to one or more identifiers. The data structure may be provided by network element 106 or other network elements. Electronic content viewing may be tracked by electronic paper display devices 112, 114, 116, and 118 and may be logged using identifiers such as, for example, a publication identifier, a page identifier, a zoom state, a scroll position, an indicator of highlighted content, and a user interface focus, and other user interface display characteristics.

Electronic paper display devices 112, 114, 116, and 118 may track other events and user activity. For example, electronic paper display devices 112, 114, 116, and 118 may track a resource request received by the device from a user such as a click on a Uniform Resource Locator ("URL"), a submission via a HTTP ("Hypertext Transfer Protocol") POST request, a submission via a HTTP GET request, and an FTP ("File Transfer Protocol") download. Other events tracked by electronic paper display devices 112, 114, 116, and 118 may include a device power state change; a user interface control change, a resource response, a device status, and an error code. For example, a device power state change may include detection of one or more of: a device powering on, a device powering off, a device hibernating, and a device suspending. A user interface control change may include detection of one or more of: a button up, a button down, a touch screen tap, a scroll wheel rotation, a touchpad input, a mouse input, a trackball input, adjustment of a sliding control, and a flipping of a toggle switch. A resource response may include one or more of: one or more portions of an HTTP server response, an indicator of a server connection, an error code, a timeout, a file transmission, or another data response from the resource. A device status may include one or more of: status of a process, status of a processor, a measurement associated with a processor, a measurement of memory, a measurement of storage, an indicator of one or more available software resources of a device, and an indicator of one or more available hardware resources of a device. Error events tracked by electronic paper display devices 112, 114, 116, and 118 may include errors generated by a process or component of an electronic paper display device and errors received via an interface to an external system, process or component. Electronic paper display devices 112, 114, 116, and 118 may track other events or user activity.

Electronic paper display devices 112, 114, 116, and 118 may record tracked events and user activity using local or remote storage. Electronic paper display devices 112, 114, 116, and 118 may use identifiers or indicators corresponding to events or user activity to record events and user activity. Electronic paper display devices 112, 114, 116, and 118 may use mapping data structures to find a corresponding identifier for events. Once an event or user activity is detected, a lookup, query, or translation may be performed using a mapping data structure to obtain a proper identifier for an event or user activity. The user activity or event may be recorded and transmitted using an identifier. The use of an identifier may reduce storage space for logging events and bandwidth for transmitting event information. A plurality of identifiers may be used for a single event such as, for example, the use of a date/time identifier, a publication identifier, a page identifier, and a zoom state identifier to log a page view by a user.

According to some embodiments, electronic paper display devices 112, 114, 116, and 118 may transmit one or more identifiers to one or more network accessible devices for storage, analysis, reporting, or other processing. The transmission of identifiers may include one or more of: an event time, an event action, an event user interface control identifier, user interface display coordinates, an event time; an identifier of a resource request associated with an event, and one or more portions of a resource response associated with an event.

According to one or more embodiments, different levels of identifiers may be recorded locally than transmitted. For example, a greater level of detail may be recorded for a user activity or event on electronic paper display devices 112, 114, 116 than is transmitted to a network accessible device. In some embodiments, a network accessible device may receive a first level of logging information such as for example, an event type and a date/time, and the network accessible device may be able to query or retrieve further information from an electronic paper display device if desired.

According to one or more embodiments, network element 110, or another component associated with an electronic content provider network, may receive one or more event identifiers from one or more electronic paper display devices. Network element 110 may be a server, a computer or other network accessible device capable of receiving and storing data associated with electronic paper display device event logging. Network element 110 may contain or access a mapping data structure which may contain the mapping used by an electronic paper display device to log an event. Network element 110 may lookup a received event identifier using the mapping data structure and may log the event. In some embodiments, an event may be logged using only the one or more received event identifiers. More detail of events logged using only identifiers may be produced using a data mapping structure when analysis or reporting of events is performed. Network element 110 may enable analysis or reporting of events. For example, certain events, such as error events, may trigger notifications which may include emails, text messages, or other electronic notifications to users of an electronic paper display device, administrators, account managers, or other individuals or groups. Other events, such as page views, for example, may be used for marketing purposes such as to determine interests, usage of content, potential sales of electronic content, etc. Certain device events may be used for diagnostic purposes (e.g., to identify a bug, performance issues, quantify bandwidth usage and needs, identify a need for an upgrade, identify a need for a new battery, etc.). Device events may also be used for other marketing such as for example, to market peripherals including storage, memory, application upgrades, network interfaces (e.g., wireless modem upgrades), new electronic paper display devices, etc.

Network element 110 may produce one or more reports associated with electronic paper display device events. For example, network element 110 or other network elements may produce reports analyzing trends, summarizing data across network devices, grouping data, filtering data, performing statistical analysis, or performing other processing. Network element 110 may also produce reports or analysis of one or more events associated with an individual electronic paper display device.

According to one or more embodiments, electronic content may be published or provided using XML ("extensible Markup Language") formatting. For example, electronic content may be provided using an Open Publication Structure ("OPS") standard, such as OPS 2.0. XML elements in an OPS publication may optionally be identified using an "id" attribute. These "id" attributes may contain any value that conforms to the XML naming conventions. This capability may be used to track one or more content views, user activity and other events. For example, a data structure, such as a mapping, may be setup between ids assigned to connect to an electronic resource and identification provided by a third party provider. This may provide tracking and reporting of user viewing and interaction statistics. An electronic paper display device may thus track usage of external resources, such as clicks on URLs ("Uniform Resource Locators") as well as viewing of electronic content accessed or obtained via the external resources.

According to some embodiments, an electronic paper display device may have the ability to log the time and zoom state of each page view. To provide additional detail and functionality for the tracking of page view logs, information such as which page an element identifier falls on in an available zoom state may be tracked. For example, depending on display option settings such as a zoom level of an electronic paper display device, different portions of a page of electronic content may be displayed in a page view (e.g., when a display is zoomed in less of a page of electronic content will be shown in a page view). Existing devices and software provide no method correlating these page views with content, therefore a content map may be created for electronic content. For example, a content map may be created at the time electronic content is rendered, such as when content is rendered into an internal secured transport format. This may be done by creating a content ID map. This ID map may contain a list of IDs displayed in one or more zoom states on one or more pages.

In addition to logging page views, devices may also log link actions whenever a user clicks on a link (<a> element). In order for the server to be able to identify the links that have been logged and have access to the entirety of their attribute lists, the ID map may contain a list of one or more attributes specified on "<a>" elements identified by the "id" specified on the "<a>" element. An exemplary "<a>" element may be:

<a id="L011_00001"href="#picture1">Click Here</a>

The exemplary "<a>" element above may generate an entry in the ID map such as, by way of non-limiting example:

```
<link content_id="L011_00001"
    attributes="id="L011_00001"
        href="#picture1"" />
```

Referring to FIG. 2, a sample of the XML ID mapping format is shown according to an exemplary embodiment. Note that an element may fall on more than one page. This is evident for the element identified as P36D_00777 above. In zoom state "1" above, part of the article is visible on page 1 and part on page 2 (pages included in the single page of FIG. 2).

To facilitate the ability to create ID maps, a number of enhancements may be provided to electronic content publishing tools. For example, a publishing tool such as PubX3.Builder of the eBook Publisher suite of tools from eBook Technologies Inc. may be modified to create ID Maps. In order to request the creation of an ID while building a publication using one of the PubX.Builder build methods, the Builder.IDMapPath property may be set to a pathname of a log file to create. The ID Map may be created when the publication is being built for a specific device. This may be indicated by a TargetDevice setting being greater than zero.

Other methods of creating ID Maps may include creating ID Maps using NMUtil of the eBook Technologies Inc. News-Manager System. The ability to create ID Maps may be provided as a NMUtil command line parameter. To request the creation of an ID Map when building a publication a "-idmap file" parameter may be added to the command line. An ID Map may be created when the "-format" parameter is specified using a value greater than 0. For example:

NMUTIL NYTimes-build-format 7-idmap id.map

ID Maps may also be created using the eBook.NewsManager .NET Interface. The ability to create ID Maps may be provided as a new OCFToIMP ("Open eBook Publication Structure ("OEBPS") Container Format to IMP") method that may take an additional IDMapPath parameter. When the IDMapPath parameter is specified and the buildTarget parameter specifies a value greater than 0, then an ID log file may be created in addition to the .IMP output publication. For example:

eBook.Publication.OCFToIMP("pub.epub", "pub", "pub-.map", 7).

According to one or more embodiments, in order to track which links a user activates (e.g., clicks or taps), user link events may be logged using the "id" attribute that was originally specified in the markup. For example, only the "id" attribute will be provided to the logging API. To determine the other attributes that were originally specified on the <a> element a processor on the server may match ids from the log with <link> elements provided in the ID map. For example:

<p>Tap<a id="X001_1" href="#advert1">here</a> to learn more.</p>

The above example shows how one might code a link to content in such a way that a user link action could be tracked. The electronic paper display device may log "X001_1" when a link is activated by a user (e.g., tapped or clicked).

Event logging may be accomplished by calling methods of the event logging API described below. Each type of event may log data appropriate for that event type. The following table enumerates the data logged for each event type:

TABLE

| Event Types | Item Logged | Description of Item Logged |
| --- | --- | --- |
| Ad View Events | Action | adview |
| | Time | GMT date/time of event encoded as an offset from a fixed epoch |
| | Publication Identifier | Id of the publication |
| | Data | The advertisement identifier |
| Page View Events | Action | View |
| | Time | GMT date/time of event encoded as an offset from a fixed epoch |
| | Publication Identifier | Id of the publication |
| | Zoom | The zoom state of the page view |
| | Page | The page number of the page |
| Link Events | Action | Link |
| | Time | GMT date/time of event encoded as an offset from a fixed epoch |
| | Publication Identifier | Id of the publication |
| | Id | The id attribute from the <a> element |
| Power Events | Action | power on, power off |
| | Time | GMT date/time of event |
| Physical UI Events | Action | button down, button up |
| | Time | GMT date/time of event |
| | Button Identifier | Id of the button being pressed |
| Touch Events | Action | Tap |
| | Time | GMT date/time of event encoded as an offset from a fixed epoch |
| | Location | X, y coordinate of event |
| Connection Requests | Action | get, post |
| | Time | GMT date/time of event encoded as an offset from a fixed epoch |
| | URL | The URL that we are getting/posting to |
| Connection Reponses | Action | get-response, post-response |
| | Time | GMT date/time of event encoded as an offset from a fixed epoch |
| | Response | Some portion of the HTTP response from the server. This probably doesn't want to include the physical content. |
| System Events | Action | system error, memory allocation error, storage error, assertions, reboot |
| | Time | GMT date/time of event encoded as an offset from a fixed epoch |
| | Description | A description of the event. |

FIG. 3 is a schematic diagram of an electronic paper display device according to an embodiment of the present invention. An exemplary such display may be an EPD such as disclosed in U.S. patent application Ser. No. 12/497,199 entitled "Electronic Display Controller," filed Jul. 2, 2009 which is hereby incorporated by reference in its entirety. Display controller 305 may be utilized to disable the display of electronic content. Display controller 305 is coupled to display 310. Display 310 displays content in accordance with the system of electronic book 300. Display controller 305 is also coupled to touch screen component 340, which may be coextensive with display 310. That is, display 310 may include touch screen capabilities by way of incorporation of touch screen 340. Display controller 305 is further coupled to external memory 320. External memory 320 may be, by way of non-limiting example, an SDRAM integrated circuit. Display controller 305 is further coupled to a sub-system that allows electronic book 300 to send and receive data, such as event data or book, magazine and newspaper content. The subsystem includes Evolution Data Optimized ("EVDO") modem 330, which itself is coupled to antenna 345 and to a System-On-Chip ("SoC") Application Specific Integrated Circuit ("ASIC") 315. SoC 315 acts as an intermediary between EVDO modem 330 and display controller 305. SoC 315 is further coupled to external volatile memory 320 (e.g., an SDRAM integrated circuit), to external persistent memory 335 (e.g., a flash memory integrated circuit), and interface I/O controller 337. An external temperature sensor (not shown) may be coupled to display controller 305.

SoC 315 may manage access to external persistent memory 335 and interface I/O controller 337. SoC 315 may receive data associated with events or may detect events. For example, SoC 315 may receive data from interface I/O controller 337 associated with a user input from a button or other user interface control. SoC 315 may also utilize other mechanisms to detect an event such as a hardware interface (e.g., a controller), a software driver, a software component, and a hardware component. SoC 315 may receive data associated with an event such as a page view from display controller 305. Display controller 305 may also provide touch screen input data received from touch screen 340 to SoC 315.

SoC 315 may utilize storage, including, but not limited to, non-volatile memory 335 to store event information. Upon subsequent connection to a network, SoC 315 may transmit event information. SoC 315 may utilize EVDO modem 330 to transmit event data or to receive or transmit one or more data mapping structures.

Figure 4:
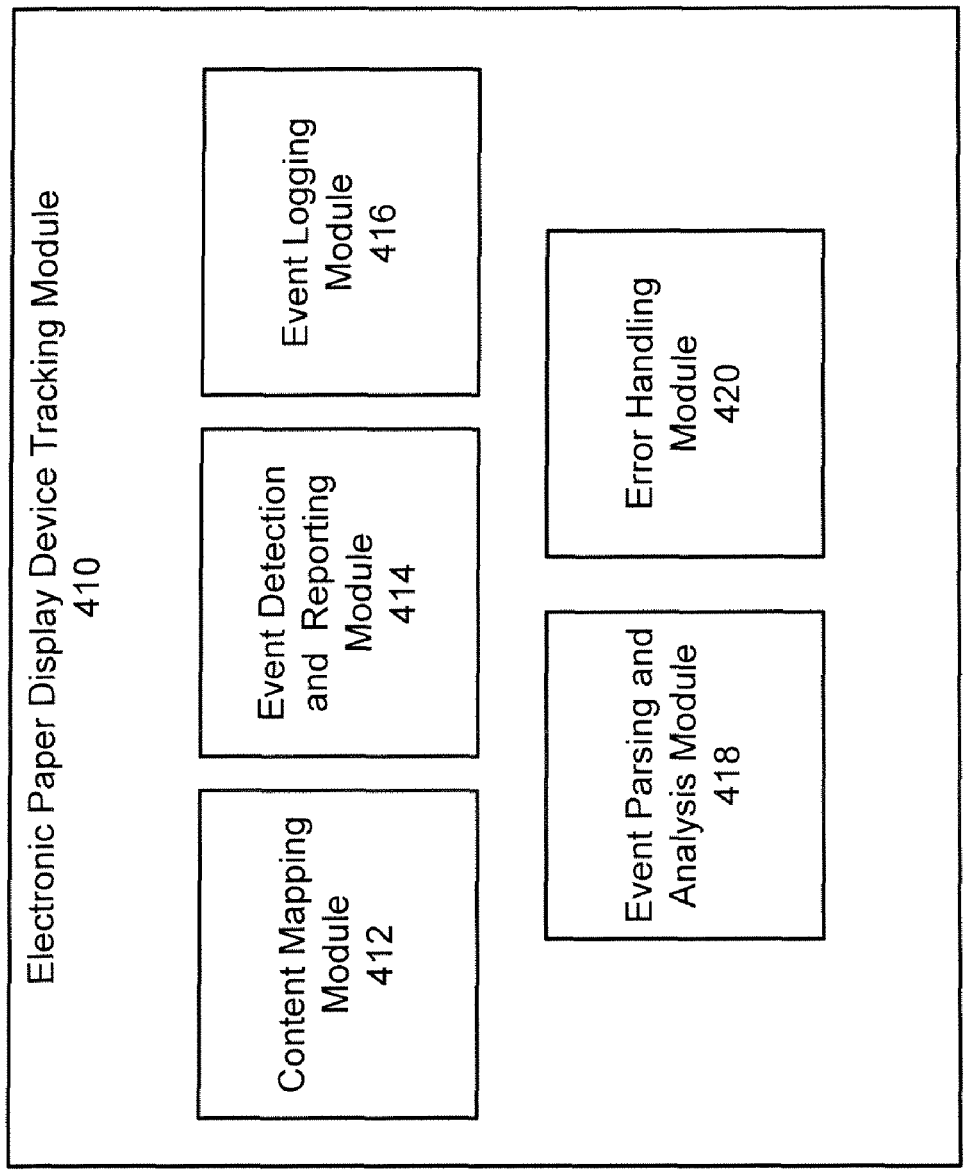
FIG. 4 shows a module for tracking electronic paper display device events in accordance with an embodiment of the present disclosure.

FIG. 4 shows electronic paper display device tracking module 410 for tracking electronic paper display device events and user activity in accordance with an embodiment of the present disclosure. Electronic paper display device tracking module 210 may contain one or more components including content mapping module 412, event detection and reporting module 414, event logging module 416, event parsing and analysis module 418, and error handling module 420. One or more portions of electronic paper display device tracking module 410 may be located on a user device, such as an electronic paper display device. According to some embodiments, one or more portions of electronic paper display device tracking module 410 may be located on a network.

Content mapping module 412 may produce one or more data structures correlating one or more of: portions of electronic content, device events, and user activity with unique identifiers. Other information may be included in a mapping data structure or ID map, such as, for example, information associating a zoom level, a scroll position, or other user interface display control settings with one or more portions of electronic content. A mapping data structure may also associate information with an information resource request such as attributes with a link or URL. Other information associated with a resource request may be information associated with a provider of the resource such as partner contact information. Content mapping module 412 may generate mapping data structures as part of a method or process of publishing electronic content. Content mapping module 412 may also provide an interface or method for generating a data mapping structure for previously published electronic content.

According to one or more embodiments, content mapping module 412 may verify the existence of a mapping data structure for one or more portions of electronic content on an electronic paper display device. Content mapping module 412 may compare a publication id associated with electronic content with an identifier of a mapping data structure. If an associated mapping data structure is not found for a publication ID, content mapping module 412 may provide the mapping data structure.

Event detection and reporting module 414 may detect events including user activity and device events. Event detection and reporting module 414 may receive data associated with an event from a processor, a hardware interface, or another component or process of an electronic paper display device. Event detection and reporting module 414 may translate, lookup, or query one or more corresponding IDs from a mapping data structure using one or more portions of the received event data. Event detection and reporting module 414 may provide event data and corresponding IDs to event logging module 416. According to some embodiments, event detection and reporting module 414 may store event data such as, for example, storing event data locally on storage associated with an electronic paper display device. According to at least one embodiment, event logging module 416 may be located on a network accessible device separate from an electronic paper display device. When the electronic paper display device is not connected to a network event detection and reporting module 414 may store event data locally on storage associated with an electronic paper display device for later transmission to event logging module 416. Event detection and reporting module 414 may store event data locally and may periodically provide event data to event logging module 416. Event detection and reporting module 414 may determine the time to provide event data to event logging module 416 based on a time of day, a level of utilization of an electronic paper display device, an amount of network traffic, specified preferences, a type of event stored (e.g., certain events may be transmitted as soon as possible, others may be lower priority), an amount of event data stored, or other factors. According to some embodiments, event data to event logging module 416 may query, poll, or otherwise initiate retrieval of event data from one or more components of an electronic paper display device, such as event detection and reporting module 414.

Event logging module 416 may receive, retrieve, or access event data for one or more electronic paper display devices. Event logging module 416 may generate separate logs for each device, may combine logs for a plurality of devices, or may group devices into logs by one or more criteria (e.g., a device type, a geographical region associated with a device, a group associated with a user of a device, and a subscription type associated with a user of a device). Event logging module 416 may store event data in local or remote storage including one or more of: Redundant Array of Inexpensive Disks ("RAID"), tape, disk, a Storage Area Network ("SAN"), an internet Small Computer Systems Interface ("iSCSI") SAN, a Fibre Channel SAN, a Common Internet File System ("CIFS"), Network Attached Storage ("NAS"), a Network File System ("NFS"), or other computer accessible storage. Event logging module 416 may utilize a database, such as an Oracle database, a Microsoft SQL Server database, a DB2 database, a MySQL database, a Sybase database, an object oriented database, a hierarchical database, or other database. Event logging module 416 may utilize flat file structures for storage of data.

Event parsing and analysis module 418 may access or receive logged event data. Event parsing and analysis module 418 may filter, sort, categorize, or otherwise process event data. Event parsing and analysis module 418 may perform statistical analysis on one or more portions of event data to identify trends, issues, problems, growth or other data patterns. For example, demand or viewing of one or more portions of electronic content may be identified. Electronic content viewing may be categorized by content provider, content topic, content type, an associated resource (e.g., a link or URL), or other factors. Electronic content viewing may be categorized by one or more factors associated with a user of an electronic paper display device (e.g., demographics associated with a user). Certain device events may be used for diagnostic purposes (e.g., to identify a bug, performance issues, quantify bandwidth usage and needs, identify a need for an upgrade, identify a need for a new battery, etc.). Device events, such as page views, may be used to market electronic content to one or more users. Device events may also be used for marketing such as for example, to market peripherals including storage, memory, application upgrades, network interfaces (e.g., wireless modem upgrades), new electronic paper display devices, etc.

Error handling module 420 may handle errors associated with logging and detecting electronic paper display device events. Error handling module 420 may log errors, send notifications, or perform corrective actions. For example, error handling module 420 may handle errors occurring if an event is detected for which a corresponding entry is not found in a mapping data structure. Error handling module 420 may also provide notifications such as text messages or emails if a device error event is detected.

Figure 5:
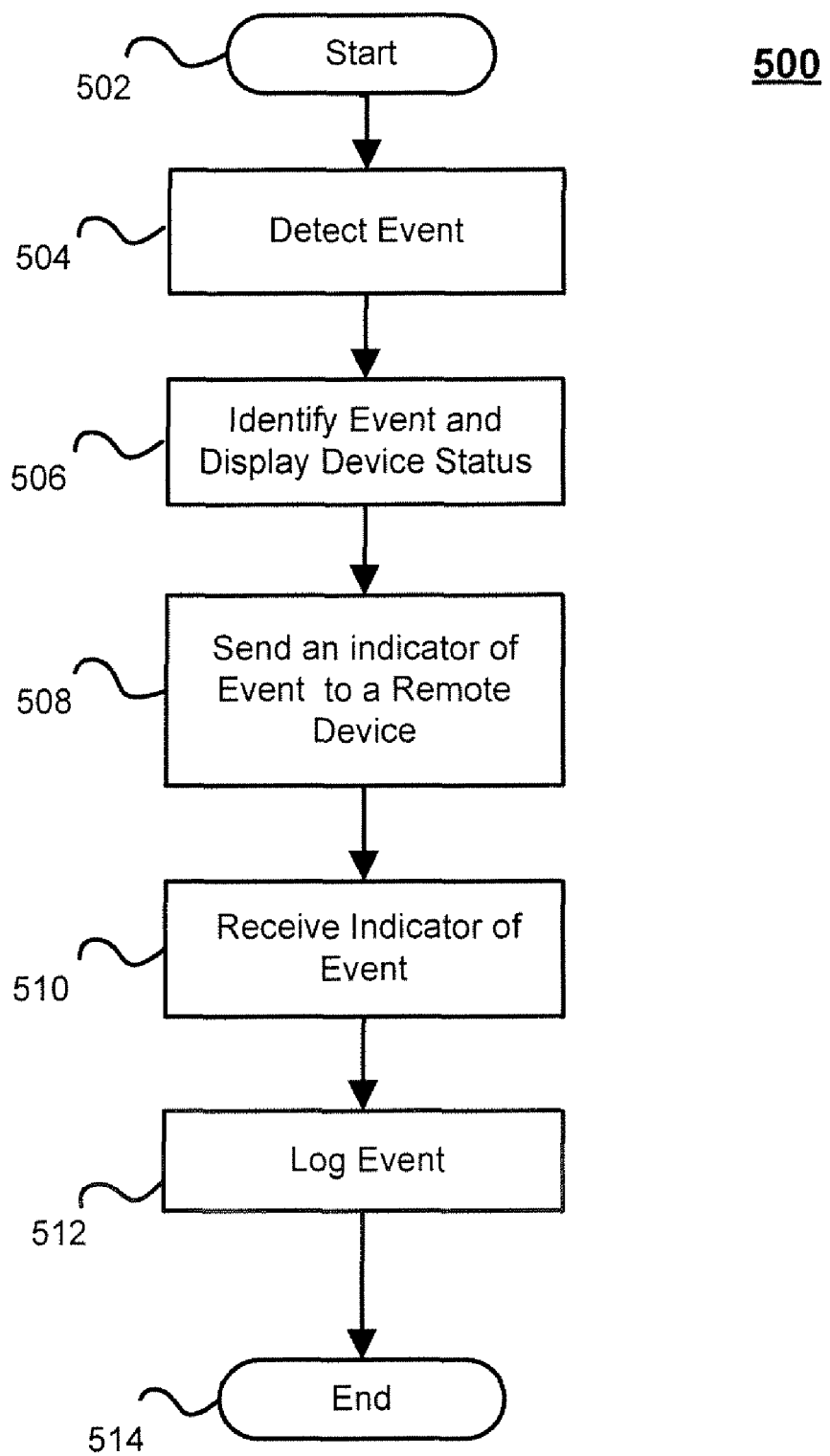
FIG. 5 is a flow chart illustrating the tracking of electronic paper display device events according to an embodiment of the present invention.

FIG. 5 is a flow chart illustrating method 500 for tracking electronic paper display device events according to an embodiment. At block 502, the method 500 for electronic paper display device events, in accordance with an exemplary embodiment, may begin.

At block 504, the method 500 may detect an event, such as user activity or a device initiated event. Detection of an event may be performed by a processor of an electronic paper display device, a hardware interface of an electronic paper display device, or another component or process of an electronic paper display device. According to some embodiments, triggers for certain events may be provided to users to allow a user to initiate an event (e.g., for example a user may be provided with an interface to an event allowing them to record interest in electronic content or to request help, service, or further information).

At block 506, the event may be identified. One or more portions of event data may be utilized to search, query, or cross reference a mapping data structure. The mapping data structure may provide one or more identifiers or other data associated with an event. Other data associated with the event may be identified such as a current device status, a time (e.g., a date time value specified from a known epoch), and an event type.

At block 508, an indicator of an event, such as a corresponding event identifier, may be sent to a remote network accessible device. According to some embodiments, event data may be stored locally and may be transmitted to or queried by a network accessible device at a later time.

At block 510, an indicator of the event may be received. The indicator may be received by a local storage and/or received by a separate device communicatively coupled to the electronic paper display device.

At block 512, the event may be logged. Logging of the event may include formatting, sorting, filtering, grouping, translating, or other processing. Logging of the event may include storage in local or remote storage. Logged event data may be analyzed for marketing purposes, planning purposes, diagnostic purposes, billing purposes, or for other uses. For example, marketing purposes may include tracking of user page views to determine suitable electronic content to market to a user of an electronic paper display device. Diagnostic purposes may include tracking error codes, device status information, device platform information (operating system version, application versions, amount of memory, amount of storage, processor, etc.). Diagnostic information may be used to provide service or support to a user as well as to suggest upgrades, fixes, and maintenance. Diagnostic information may also include tracking network activity from one or more electronic paper display devices to identify connectivity issues, bandwidth issues, performance problems, or other network related issues. Billing purposes may include tracking and billing a user for use of content as well as crediting third party providers for usage of third party content, or billing third party providers for sales commissions, or referrals. Planning purposes may include identifying resources based on demand for certain content. Planning purposes may also include identifying areas of demand where additional network resources may be required (e.g., the necessary bandwidth to push out a certain number of subscriptions to a daily periodical based on demand).

At block 514, the method 500 may end.

The description above describes one or more devices including user devices, a communication network having network elements that are coupled to each other via one or more links (e.g., physical or logical), a communication network, and other elements for coupling users to the communication network, some of which are explicitly depicted, others of which are not. As used herein, the term "module" may be understood to refer to executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a Compact Disc ("CD"), a Digital Versatile Disc ("DVD"), a floppy disk, a hard drive, Read Only Memory ("ROM"), Random Access Memory ("RAM"), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A hardware implemented method for tracking events occurring on an electronic paper display device, the method comprising:

using a computer processor, detecting an event occurring at the electronic paper display device;

using the computer processor, identifying an event identifier corresponding to the detected event by using one of more portions of the detected event to query a mapping data structure, wherein the mapping data structure comprises a mapping of extensible markup language (XML) elements to one or more event identifiers, the one or more event identifiers comprising a publication identifier, a page identifier, a zoom state, a scroll position, an indicator of highlighted content, and a user interface focus;

using the computer processor, identifying a device status of the electronic paper display device; and transmitting the event identifier and the device status via a network to a network accessible device.

2. The method of claim 1, wherein the event identifier provides electronic content usage information for generation of targeted marketing materials associated with the electronic content.

3. The method of claim 1, wherein the event identifier provides diagnostic information for diagnosing technical problems associated with the electronic paper display device.

4. The method of claim 1, wherein the event identifier provides planning information for identifying network resource requirements to address user demand for electronic content.

5. The method of claim 1, wherein the event comprises viewing a page of electronic content on the electronic paper display device.

6. The method of claim 1, wherein the step of transmitting further comprises transmitting at least one of: an event time, an event action, an event user interface control identifier, user interface display coordinates, an identifier of a resource request associated with an event, one or more portions of a resource response associated with an event, and a combination of the preceding.

7. The method of claim 6, wherein a resource request comprises at least one of: a click on a Uniform Resource Locator ("URL"), a submission via a POST request, a File Transfer Protocol ("FTP") download, and a combination of the preceding.

8. The method of claim 1, wherein the event comprises at least one of: a resource request, a device power state change, a user interface control change, a resource response, a device status, an error code, and a combination of the preceding.

9. The method of claim 8, wherein the user interface control change comprises at least one of: a button up, a button down, a touch screen tap, a scroll wheel rotation, a touchpad input, a mouse input, a trackball input, adjustment of a sliding control, a flipping of a toggle switch, and a combination of the preceding.

10. The method of claim 1, wherein the network accessible device comprises a server for logging electronic paper display device events.

11. At least one non-transitory processor readable storage medium for storing a computer program of instructions configured to be readable by at least one processor for instructing the at least one processor to execute a computer process for performing the method as recited in claim 1.

12. An electronic paper display device comprising:
a persistent display for displaying electronic content;
a communications module for transmitting electronic paper display device event information; and
a processor communicatively coupled to the display and the communications module, wherein the processor is configured to:
detect an event occurring at the electronic paper display device;
identify an event identifier corresponding to the detected event by using one of more portions of the detected event to query a mapping data structure, wherein the mapping data structure comprises a mapping of extensible markup language (XML) elements to one or more event identifiers, the one or more event identifiers comprising a publication identifier, a page identifier, a zoom state, a scroll position, an indicator of highlighted content, and a user interface focus;
identify a device status of the electronic paper display device; and
transmit the event identifier and the device status via a network to a network accessible device.

13. The electronic paper display device of claim 12, wherein the event comprises viewing a page of electronic content on the electronic paper display device.

14. The electronic paper display device of claim 12, wherein the transmission further comprises transmitting at least one of: an event time, an event action, an event user interface control identifier, user interface display coordinates, an identifier of a resource request associated with an event, one or more portions of a resource response associated with an event, and a combination of the preceding.

15. The electronic paper display device of claim 14, wherein a resource request comprises at least one of: a click on a Uniform Resource Locator ("URL"), a submission via a POST request, a File Transfer Protocol ("FTP") download, and a combination of the preceding.

16. The electronic paper display device of claim 12, wherein the event comprises at least one of: a resource request, a device power state change, a user interface control change, a resource response, a device status, an error code, and a combination of the preceding.

17. The electronic paper display device of claim 16, wherein the user interface control change comprises at least one of: a button up, a button down, a touch screen tap, a scroll wheel rotation, a touchpad input, a mouse input, a trackball input, adjustment of a sliding control, a flipping of a toggle switch, and a combination of the preceding.

18. The electronic paper display device of claim 12, wherein the network accessible device comprises a server for logging electronic paper display device events.

19. The electronic paper display device of claim 12, wherein the processor is further configured to store data associated with the event in electronic storage associated with the electronic paper display device.

20. The electronic paper display device of claim 12, wherein the event identifier provides electronic content usage information for generation of targeted marketing materials associated with the electronic content.

21. The electronic paper display device of claim 12, wherein the event identifier provides diagnostic information for diagnosing technical problems associated with the electronic paper display device.

22. The electronic paper display device of claim 12, wherein the event identifier provides planning information for identifying network resource requirements to address user demand for electronic content.

23. The electronic paper display device of claim 12, wherein the mapping of XML elements to one or more event identifiers identifies one or more XML elements associated with a page of electronic content and a zoom level.

24. A system for tracking events of an electronic paper display device comprising:
one or more processors, wherein the one or more processors are configured to:
generate a data structure mapping events to one or more event identifiers,
wherein the data structure comprises a mapping of extensible markup language (XML) elements to one or more event identifiers, the one or more event identifiers comprising a publication identifier, a page identifier, a zoom state, a scroll position, an indicator of highlighted content, and a user interface focus;
provide the data structure to an electronic paper display device;
receive one or more event identifiers associated with a detected event and a device status from the electronic paper display device; and
record data associated with the event identifiers.

25. The system of claim 24, further comprising:
generating of targeted marketing materials based at least in part on the recorded data.

26. The system of claim 24, further comprising:
diagnosing technical problems associated with the electronic paper display device based at least in part on the recorded data.

27. The system of claim 24, further comprising:
identifying network resource requirements to address user demand for electronic content based at least in part on the recorded data.

* * * * *